(12) United States Patent
Woodruff

(10) Patent No.: US 7,731,859 B2
(45) Date of Patent: Jun. 8, 2010

(54) PROCESS FOR CONDITIONING SEWAGE SLUDGE

(76) Inventor: Ronald Eugene Woodruff, 33101 FM 1301, West Columbia, TX (US) 77486

( * ) Notice: Subject to any disclaimer, the term of this patent is extended or adjusted under 35 U.S.C. 154(b) by 249 days.

(21) Appl. No.: 11/456,408

(22) Filed: Jul. 10, 2006

(65) Prior Publication Data

US 2008/0006585 A1  Jan. 10, 2008

(51) Int. Cl.
C02F 1/66 (2006.01)
C02F 1/68 (2006.01)
C05F 7/00 (2006.01)

(52) U.S. Cl. ............ 210/764; 210/749; 71/12; 71/61; 71/64.01

(58) Field of Classification Search ........ 210/749, 210/702, 723, 724, 726, 764; 422/13, 11, 422/5, 28; 71/12, 61, 63, 64.01
See application file for complete search history.

(56) References Cited

U.S. PATENT DOCUMENTS

| | | | |
|---|---|---|---|
| 3,393,143 A | 7/1968 | Waterman et al. .......... 204/306 |
| 4,053,401 A | 10/1977 | Fukushima et al. .......... 210/52 |
| 4,270,279 A * | 6/1981 | Roediger .................... 210/609 |
| 4,306,978 A | 12/1981 | Wurtz ........................ 210/750 |
| 4,364,773 A | 12/1982 | Veronneau et al. ........ 106/281 R |
| 5,207,926 A | 5/1993 | Liu ............................ 210/749 |
| 5,277,826 A | 1/1994 | Burns et al. ................ 210/751 |
| 5,435,923 A | 7/1995 | Girovich .................... 210/770 |
| 5,492,620 A | 2/1996 | Evans ........................ 210/96.1 |
| 5,575,928 A | 11/1996 | Peltier, Jr. et al. .......... 210/764 |
| 5,599,461 A | 2/1997 | Peltier, Jr. et al. .......... 210/764 |
| 5,603,842 A | 2/1997 | Whitaker et al. ........... 210/743 |
| 5,660,733 A | 8/1997 | Deskins ...................... 210/712 |
| 5,679,262 A | 10/1997 | Girovich et al. ............ 210/751 |
| 5,851,404 A * | 12/1998 | Christy et al. .............. 210/758 |
| 5,972,227 A | 10/1999 | Peltier, Jr. et al. .......... 210/764 |
| 6,344,143 B1 | 2/2002 | Ahn et al. ................... 210/620 |
| 6,558,550 B1 | 5/2003 | Kelly ......................... 210/609 |
| 6,808,636 B2 | 10/2004 | Ward et al. ................. 210/710 |
| 2002/0043505 A1 | 4/2002 | Olson ......................... 210/749 |
| 2004/0094484 A1 | 5/2004 | Zhuang ...................... 210/721 |
| 2005/0006312 A1 | 1/2005 | Brisset ....................... 210/721 |

FOREIGN PATENT DOCUMENTS

| JP | 354121561 A | 9/1979 |
|---|---|---|
| JP | 358131200 A | 8/1983 |
| JP | 403207497 A | 9/1991 |

OTHER PUBLICATIONS

Christy, Sr, Water Environment & Technology, Treatment Process: Sludge Disposal Using Lime, 1990.*

* cited by examiner

Primary Examiner—Matthew O Savage
Assistant Examiner—Lucas Stelling
(74) Attorney, Agent, or Firm—Kloss, Stenger & LoTempio; Vincent G. LoTempio; Douglas R. Smith

(57) ABSTRACT

A method of treating sewage sludge that has a solids concentration of about 18-35% by weight includes treating the sewage sludge with sodium hydroxide, potassium hydroxide, or a combination thereof to increase its pH to at least about 12, and treating the sewage sludge with calcium oxide. The treatment of the sewage sludge with the calcium oxide can take place before and/or during the treatment of the sludge with the sodium hydroxide, potassium hydroxide, or a combination thereof. The amount of calcium oxide used is about 0.05-0.8% by weight of the sewage sludge.

11 Claims, No Drawings

PROCESS FOR CONDITIONING SEWAGE SLUDGE

BACKGROUND OF THE INVENTION

Sewage sludge is generated during the treatment of wastewater in wastewater treatment facilities, septic tanks, and lagoons. By definition, sewage sludge is "solid, semi-solid, or liquid residue generated during the treatment of domestic sewage in a treatment works." (U.S. Environmental Protection Agency (EPA) regulations in Title 40 of the Code of Federal Regulations (CFR), Part 503.9(w)). Sewage sludge typically contains harmful microorganisms, such as pathogenic bacteria, enteric viruses, and helminth ova. In addition, sewage sludge typically produces unpleasant odors due to bacterial breakdown of fat, protein, and carbohydrate molecules into volatile molecules. Also, sewage sludge often attracts undesirable pests, such as flies and rats, a problem which is referred to as "vector attraction."

Sewage sludge that has a relatively high water content is typically dewatered at some point in its treatment. The reduction of the water content of the sewage sludge makes it easier to handle, among other things. After dewatering, the sewage sludge typically is in the form of an 18-30% solids cake, with the balance of the weight of the sludge being water. Before the sewage sludge can be applied to land without restriction, it must meet pathogen reduction requirements. Several alternatives exist to achieve pathogen reduction, including composting, heat treatment at >160° F., incineration, or treatment with chemicals such as methyldithiocarbamic acid or its salts.

In some cases additional treatment of the sewage sludge may be needed to reduce vector attraction. One way of doing this involves treating the sewage sludge with an agent to increase its pH to 12 or higher. Sodium hydroxide and potassium hydroxide are two compounds that are commonly used for this purpose. Although this method is effective to reduce vector attraction, it also has the undesirable effect of changing the consistency of the sewage sludge from a moist, friable solid to a slimy semi-liquid. In this condition, the sewage sludge is difficult to handle, and does not respond to conventional conditioning methods such as flocculant addition, heat treatment, or filtration.

There is a need for improved processes for treating sewage sludge that can overcome or minimize one or more of the problems discussed above.

SUMMARY OF THE INVENTION

One aspect of the invention is a method of treating sewage sludge that has a solids concentration of about 15-35% by weight. The method includes treating the sewage sludge with sodium hydroxide, potassium hydroxide, or a combination thereof to increase its pH to at least about 12, and conditioning the sewage sludge with calcium oxide. The conditioning of the sewage sludge with the calcium oxide can take place before and/or during the treatment of the sludge with sodium or potassium hydroxides. The amount of calcium oxide used is about 0.05-0.8% by weight of the sewage sludge. In some embodiments of the invention, the sewage sludge is treated with enough alkali hydroxide to increase its pH to between about 12 and about 12.5, and the amount of calcium oxide is about 0.15-0.5% by weight of the sewage sludge, or in some cases, about 0.28% by weight.

In another embodiment of the invention, the method includes treating sewage sludge that has a solids concentration of about 15-35% by weight with sodium hydroxide, potassium hydroxide, or a combination thereof to increase its pH to at least about 12, and treating the sewage sludge with calcium hydroxide. The treatment of the sewage sludge with the calcium hydroxide can take place before and/or during the treatment of the sludge with the above-named alkali hydroxides. The amount of calcium hydroxide used is about 0.05-0.8% by weight of the sewage sludge, or in some cases about 0.25-0.5%, or about 0.36%.

DESCRIPTION OF SPECIFIC EMBODIMENTS

A process for treating wastewater (e.g., either domestic sewage or domestic sewage commingled with other wastewater) usually includes the steps of clarifying the influent wastewater to separate solids from water, treating the clarified wastewater in a biological process, clarifying the wastewater after biological treatment, treating the wastewater with chlorine, and dechlorinating the wastewater prior to releasing it to the environment. The solids generated during the clarification step, known as sewage sludge, can be digested to reduce the bacterial content and then dewatered to produce a cake. The sewage sludge can also be treated with at least one compound that produces methyl isothiocyanate (MITC) when exposed to water and organic matter. A variety of compounds that will generate MITC when contacted with water are known, such as methyldithiocarbamic acid and several of its salts. Suitable salts include, but are not limited to, alkali N-methyl dithiocarbamates. One suitable compound is sodium N-methyldithiocarbamate, which is commonly referred to as metam-sodium and is commercially available at a 42% concentration in an aqueous solution. The dosage of 42% metam sodium can vary, but in some cases will be about 3-5 gallons per dry short ton of sewage sludge solids. The sewage sludge can be left in a closed vessel after and/or while it is treated with MITC for a time sufficient to allow the desired elimination of helminth ova, bacteria, viruses, and the like. The temperature of the sewage sludge during this time is usually about 50-120° F.

After MITC treatment, the pH of the sewage sludge can be increased to 12 or greater to reduce vector attraction. For example, the sewage sludge can be kept at a pH>12 for at least about two hours and at a pH>11.5 for at least about an additional 22 hours, before optionally being treated with an acidic compound to produce a more neutral pH (e.g., about 5.5-8.0).

There are several chemical agents that are suitable for elevating pH, such as sodium hydroxide, potassium hydroxide, and calcium hydroxide. Sodium hydroxide can be obtained commercially in a solid form as flakes or beads, or in aqueous solutions (e.g., 50% concentration). Likewise, potassium hydroxide can be obtained commercially as a solid or as a 45% solution in water. It can be advantageous to use potassium hydroxide for pH elevation of sewage sludge that will eventually be applied to land, because potassium is beneficial to plant growth. Sodium hydroxide is easy to use in a liquid solution form with conventional tank storage and pumping equipment, and is relatively inexpensive.

Calcium hydroxide usually is produced by mixing calcium oxide (commonly known as quicklime) with water (which is referred to as "slaking" the quicklime). Special handling equipment is required to unload calcium oxide and to convey it to the slaking operation. Dust control, cooling equipment, and a continuous mix/agitation in the slaked lime storage vessel are usually requirements for the use of calcium hydroxide in the pH adjustment process. If slaking occurs prior to use of the calcium hydroxide in pH elevation of the sewage sludge, the material must be constantly agitated during storage to avoid settling and resultant plugging and non-uniform feeding. Use of calcium hydroxide exclusively in pH elevation results in a hard, difficult to handle solid, having the general characteristics of partially dried cement. As such, it is difficult to apply to land without a subsequent pH reduction step. Because of the cement-like nature of the sewage sludge cake/calcium hydroxide mixture, acid treatment to reduce pH is impractical. Thus, calcium hydroxide, while effective by itself as a pH elevation agent, generates a treated sewage sludge that is physically unattractive for land application.

As discussed above, it has been found that the addition of either sodium hydroxide or potassium hydroxide causes a breakdown in the semi-solid consistency of the treated sewage sludge, resulting in a slimy, difficult to handle semi-liquid that has the consistency of pudding. Without being bound by a specific theory, it is believed that these strong alkalis destroy the various wetting agents that are commonly used during the dewatering step in the wastewater treatment plant. With the breakdown of the wetting agents, water is released, resulting in the slimy consistency of the elevated pH sewage sludge. As a result, the sewage sludge will flow to fit the shape of a container, will leak through openings, and cannot be handled by conventional solids handling equipment such as conveyors, front-end loaders or dump trucks. In this form, the slimy sewage sludge is difficult to load, transport, or apply to land without the use of specialized equipment. Because in this form it can easily drip or spill and possesses a high pH, it also presents a potential safety hazard to persons who are processing the material. The slimy consistency is not mitigated by the addition of more wetting agents, or by pH reduction through the use of acids.

It surprisingly has been found that the addition of a very small amount of calcium oxide to sewage sludge before and/or during the time that sewage sludge is undergoing pH elevation with potassium hydroxide or sodium hydroxide will maintain the earth-like consistency of the sewage sludge. Namely, the sewage sludge maintains or is returned to its concentration of about 15-35% solids by weight without becoming a partially dried cement-like solid as when using calcium hydroxide exclusively, nor becoming a semi-liquid with a consistency like pudding as when using either sodium hydroxide or potassium hydroxide exclusively. This earth-like consistency makes the sewage sludge relatively easy to handle, transport, store, and apply to land with conventional equipment.

Therefore, the sewage sludge, which has a solids concentration of about 15-35% by weight, is treated with alkali hydroxide to increase its pH to at least about 12, or in some cases between about 12 and about 12.5. Before and/or during the alkali treatment, the sewage sludge is also treated with calcium oxide. The amount of calcium oxide used is about 0.05-0.8% by weight of the sewage sludge. In some embodiments of the invention, the amount of calcium oxide is about 0.15-0.5% by weight of the sewage sludge, preferably about 0.28% by weight. The alkali hydroxide can be sodium hydroxide, potassium hydroxide, or a combination thereof. In many embodiments of the invention, no flocculant needs to be added to the sewage sludge. Likewise, in many embodiments, the sewage sludge does not need to be heat treated or further dewatered. In general, neither of these methods is effective once the slimy consistency occurs.

The small amount of lime added to the sewage sludge in this method is not enough to adjust the pH of the sewage sludge. The purpose of adding this small amount of lime is solely to manage the physical consistency of the final treated sewage sludge cake.

In another embodiment of the invention, sewage sludge that has a solids concentration of about 15-35% by weight is treated with calcium hydroxide, and the pH of the sewage sludge is increased to at least about 12, or in some cases between about 12 and about 12.5. The treatment with calcium hydroxide occurs before and/or during the pH increase. The amount of calcium hydroxide used is about 0.05-0.8% by weight of the sewage sludge, or in some embodiments, about 0.25-0.5%, or about 0.36%. The pH of the sewage sludge can be raised by treatment, for example, with potassium hydroxide or sodium hydroxide. In many situations, no flocculant needs to be added to the sewage sludge, and the sewage sludge should not need heat treatment or further dewatering. As mentioned above, flocculants or heat treatment is ineffective once the sewage sludge has reached a slimy consistency.

The following examples further illustrate embodiments of the invention.

Example 1

An 18,000 pound batch of wet sewage sludge containing approximately 4,000 pounds of solids on a dry basis was treated with 3 gallons of metam sodium (trade name Rid-A-Vec™) and mixed in a double auger/paddle type mixer for about 6 minutes. The consistency of the sewage sludge batch was that of a filter cake (i.e., friable wet solid). To the batch was added one 50-pound bag of powdered quicklime (98% calcium oxide/2% water) and the quicklime was thoroughly mixed with the sewage sludge for a period of 10 minutes. Subsequently, the treated batch was pH adjusted with caustic soda (90% sodium hydroxide) beads until the contents of the batch uniformly registered a pH of 12.5. The batch was allowed to stand for 24 hours, at which time the pH of the treated sewage sludge was >11.5. The consistency of the treated sewage sludge retained its original form, i.e., the form of a wet filter cake.

Example 2

An 18,000 pound batch of wet sewage sludge containing approximately 4,000 pounds of solids on a dry basis was treated with 3 gallons of metam sodium (trade name Rid-A-Vec™) and mixed in a double auger/paddle type mixer for about 6 minutes. The consistency of the sewage sludge batch was that of a filter cake (i.e., friable wet solid). To the batch was added one 50-pound bag of powdered quicklime (98% calcium oxide/2% water) and the quicklime was thoroughly mixed with the sewage sludge for a period of 10 minutes. Subsequently, the treated batch was pH adjusted with 45% potassium hydroxide (caustic potash) until the contents of the batch uniformly registered a pH of about 12.5. The batch was allowed to stand for 24 hours, at which time the pH of the treated sewage sludge was >11.5. The consistency of the treated sewage sludge retained its original form, i.e., the form of a wet filter cake.

Example 3

An 18,000 pound batch of wet sewage sludge containing approximately 4,000 pounds of solids on a dry basis was treated with 3 gallons of metam sodium (trade name Rid-A-Vec™) and mixed in a double auger/paddle type mixer for about 6 minutes. The consistency of the sewage sludge batch was that of a filter cake (i.e., friable wet solid). No quicklime was added to the batch. Subsequently, the treated batch was pH adjusted with caustic soda (90% sodium hydroxide) beads until the contents of the batch uniformly registered a pH of 12.5. The batch was allowed to stand for 24 hours, at which time the pH of the treated sewage sludge was >11.5. The physical rheology of the batch after the 24-hour pH adjustment period was that of an unfilterable, slimy semi-liquid.

The preceding description relates to specific embodiments of the present invention. It is not intended to be an exhaustive list of every possible embodiment of the invention. Persons skilled in the relevant field will recognize that modifications could be made to the specific embodiments described in this patent application which would be within the scope of the following claims.

The invention claimed is:

1. A method of treating sewage sludge to maintain its physical consistency, comprising: treating sewage sludge that has a solids concentration of about 15-35% by weight with sodium hydroxide, potassium hydroxide, or a combination thereof to increase its pH to at least about 12; and treating the sewage sludge with calcium oxide, either before or during the treatment of the sewage sludge with the sodium hydroxide, potassium hydroxide, or combination thereof, wherein the amount of calcium oxide is about 0.05-0.8% by weight of the sewage sludge such that the sewage sludge is maintained at the same or near the same consistency as it had during or prior to the sodium hydroxide, potassium hydroxide, or a combination thereof pH elevation.

2. The method of claim 1, wherein the sewage sludge is treated with enough sodium hydroxide, potassium hydroxide, or a combination thereof to increase its pH between about 12 and about 12.5.

3. The method of claim 1, wherein the amount of calcium oxide is about 0.15-0.5% by weight of the sewage sludge.

4. The method of claim 1, wherein the amount of calcium oxide is about 0.28% by weight of the sewage sludge.

5. The method of claim 1, wherein no organic flocculant is added to the sewage sludge.

6. The method of claim 1, wherein the sewage sludge is not heat treated.

7. A method of treating sewage sludge comprising: treating sewage sludge that has a solids concentration of about 15-35% by weight with sodium hydroxide, potassium hydroxide, or a combination thereof to increase its pH to at least about 12; and treating the sewage sludge with calcium hydroxide, either before or during the treatment of the sewage sludge with the sodium hydroxide, potassium hydroxide, or combination thereof, wherein the amount of calcium hydroxide is about 0.05-0.8% by weight of the sewage sludge such that the sewage sludge is either maintained at or returned to the same or near the same consistency as it had during or prior to the sodium hydroxide, potassium hydroxide, or a combination thereof pH elevation.

8. The method of claim 7, wherein the amount of calcium hydroxide is about 0.25-0.5% by weight of the sewage sludge.

9. The method of claim 7, wherein the amount of calcium hydroxide is about 0.36% by weight of the sewage sludge.

10. The method of claim 7, wherein no organic flocculant is added to the sewage sludge.

11. The method of claim 7, wherein the sewage sludge is not heat treated.

* * * * *